United States Patent [19]

Helm et al.

[11] Patent Number: 4,683,111
[45] Date of Patent: Jul. 28, 1987

[54] GAS CIRCULATOR FOR A NUCLEAR REACTOR AND A METHOD FOR USE THEREOF

[75] Inventors: John L. Helm, Groton; John S. Leonard, Lyme, both of Conn.

[73] Assignee: Proto-Power Corporation, Groton, Conn.

[21] Appl. No.: 821,844

[22] Filed: Jan. 23, 1986

[51] Int. Cl.$^4$ .............................................. G21C 3/56
[52] U.S. Cl. .................................. 376/391; 376/394; 417/424; 384/446
[58] Field of Search .............. 376/391, 393, 394, 392; 417/424; 384/446

[56] References Cited

U.S. PATENT DOCUMENTS

| | | | |
|---|---|---|---|
| 3,950,220 | 4/1976 | Holz | 376/391 |
| 4,224,983 | 9/1980 | Thurston | 376/391 |
| 4,299,660 | 11/1981 | Quade | 376/391 |

*Primary Examiner*—Donald P. Walsh
*Attorney, Agent, or Firm*—Pasquale A. Razzano

[57] ABSTRACT

An improved gas circulator for a gas-cooled nuclear reactor system is disclosed which includes a stator, a rotor having a rotor shaft, and an impeller attached to one end thereof. A radial active magnetic bearing and a radial backup bearing are positioned proximate each end of the rotor shaft. An axial active magnetic bearing is also located between the ends of the rotor shaft, as is an axial backup bearing, with two of the backup bearings enclosed within a sealed chamber that may contain a lubricant, for example, a solid lubricant or a liquid lubricant. Preferably, the gas circulator is installed in a nuclear reactor system with the rotor shaft in a substantially vertical orientation and the sealed chamber near the bottom of the rotor shaft. The lower radical backup bearing and the axial backup bearing are advantageously located within the sealed chamber. The lower radial backup bearing and the axial backup bearing may be spaced apart sufficiently to permit the lower radial backup bearing to provide substantially all radial support for the rotor when the radial active magnetic bearings are deenergized.

51 Claims, 8 Drawing Figures

GAS CIRCULATOR FOR A NUCLEAR REACTOR AND A METHOD FOR USE THEREOF

BACKGROUND OF THE INVENTION

The invention relates, in general, to coolant pumps for nuclear reactors. More particularly, the invention pertains to an improved gas circulator for a gas-cooled nuclear reactor.

Gas-cooled nuclear reactors are known. For instance, U.S. Pat. Nos. 3,138,535, 3,201,320, 3,201,321, all to Fortescue et al.; U.S. Pat. No. 3,244,598 to Rose et al.; U.S. Pat. No. 3,444,038 to Schabert; and commonly owned, copending application Ser. No. 810,993, entitled "Inherently Safe, Modular, High-Temperature Gas-Cooled Reactor System," describe gas-cooled nuclear reactors. The disclosures of such patents and patent application are hereby incorporated herein by reference.

A coolant pump for a gas-cooled nuclear reactor is generally referred to as a circulator or blower. Several types of circulators for gas-cooled nuclear reactors are known, e.g., electric drive circulators and turbine drive circulators.

Some older gas-cooled nuclear reactor systems employ electric drive circulators. The drive motor is outside of the primary system pressure boundary, while the impeller is inside of the primary system pressure boundary. Consequently, the drive shaft extends through the primary system pressure boundary, and a shaft seal for the drive shaft is required. The shaft seal for the drive shaft has reactor system pressure on one side of it and ambient pressure on the other side of it.

A gas-cooled nuclear reactor system with a system-to-ambient shaft seal has a number of disadvantages. Seal design constraints may limit reactor system operating pressures and/or temperatures. The heat transfer effectiveness of the gas coolant, therefore, may be adversely affected. Moreover, seal design constraints may limit the maximum rotational speed of the circulator, thereby constraining its design. Furthermore, sealing fluids may become a source of contamination for the reactor system.

Some newer gas-cooled nuclear reactor systems utilize electric drive circulators or turbine drive circulators that are located within the primary system pressure boundary. In other words, the circulator is submerged in the coolant gas pressure envelope. Consequently, only cable penetrations and/or pipe penetrations through the primary system pressure boundary are necessary. A nuclear reactor system with a submerged circulator eliminates a system-to-ambient shaft seal, and it may tolerate higher system pressures and/or temperatures than the older gas-cooled nuclear reactor systems. One of two variations of the submerged circulator concept is typically used in a gas-cooled nuclear reactor system. Specifically, a system may have electric drive circulators with oil-lubricated bearings or steam drive circulators with water-lubricated bearings.

However, several problems are associated with gas-cooled nuclear reactor systems having submerged circulators. Lubrication of the bearings for a submerged circulator may be burdensome because the bearings are contained within the primary system pressure boundary. A bearing lubrication system for a circulator may have a source of a bearing lubricant and/or a source of a buffer gas located outside of the primary system pressure boundary. Accordingly, the bearing lubrication system may be complex, expensive, and difficult to install and maintain. Furthermore, if oil or water is used as a lubricant, the oil or water lubricant may enter and contaminate the reactor system.

In gas-cooled nuclear reactor systems having electric drive circulators with oil-lubricated bearings, rapid depressurization of the reactor may disrupt the lubrication system and, therefore, result in a loss of the capability for forced circulation, and may cause oil to enter and contaminate the reactor system. In addition, the maximum rotational speed of the circulator may be limited by the so-called oil whip problem. Moreover, the maximum temperature of the gas coolant at the inlet of the circulator may be limited inasmuch as the temperature of the oil-lubricated bearings must be kept within the temperature limits of the oil.

In gas-cooled nuclear reactor systems having turbine drive circulators with water-lubricated bearings, rapid depressurization of the reactor may disrupt the lubrication system and cause water to enter the reactor system. Additionally, turbine drive circulators with water-lubricated bearings are typically designed so that the bearing water pressure is greater than the reactor system pressure, and a buffer gas is utilized to balance the bearing water pressure and the reactor system pressure. However, the bearing water pressure may overcome the buffer gas pressure at certain times. As a result, water leakage into the reactor system is a significant problem for turbine drive circulators with water-lubricated bearings.

In a circulator with conventional bearings, the rotor may become unbalanced and cause the circulator to vibrate, which results in metal fatigue and noise. The vibration-generated noise problem may be a crucial consideration in certain applications of a gas-cooled nuclear reactor system. Furthermore, if the rotor imbalance is excessive, the cost of correcting this situation is high since the rotor must be removed from the circulator and rebalanced.

Accordingly, a need exists for a circulator for a gas-cooled nuclear reactor that minimizes the potential for contamination of the reactor system, that imposes few constraints on reactor system operating parameters, and that minimizes vibrations.

SUMMARY OF THE INVENTION

A gas circulator according to the invention solves the problems associated with conventional gas circulators and satisfies the need identified above. Moreover, a gas circulator according to the invention is compatible with and may be installed in existing gas-cooled nuclear reactor systems. Such a gas circulator places few restrictions on reactor system operating pressures and/or temperatures. In addition, such a gas circulator avoids using a system-to-ambient shaft seal. Such a gas circulator minimizes the potential for contamination of the nuclear reactor system by a bearing lubricant. Furthermore, such a gas circulator may allow rotor vibrations to be reduced or eliminated and may permit rotor balancing to be accomplished while the circulator is operating.

The invention overcomes the disadvantages of known gas circulators by providing an electric motor drive gas circulator fitted with active magnetic bearings which are submerged or hermetically sealed within the reactor pressure boundary. A radial active magnetic bearing is positioned proximate each end of the rotor shaft. A radial backup or "catcher" bearing is also positioned proximate each end of the rotor shaft. An axial or thrust active magnetic bearing is located between the ends of the rotor shaft, as is an axial backup or "catcher" bearing. The axial backup bearing and a radial backup bearing are enclosed within a sealed chamber. A backup bearing may be an antifriction bearing, for instance, a ball bearing or a roller bearing. However, another type of bearing may be used as a backup bearing, such as a bearing having a graphite bushing mounted on the stator, with or without an associated metal sleeve mounted on the rotor. The chamber may contain a lubricant, for example, a solid lubricant or a liquid lubricant.

Preferably, a gas circulator according to the invention is installed in a nuclear reactor system with the rotor shaft in a substantially vertical orientation, and the sealed chamber is proximate the bottom of the rotor shaft. The lower radial backup bearing and the axial backup bearing may be located within the sealed chamber. The lower radial backup bearing and the axial backup bearing may be spaced apart sufficiently to permit the lower radial backup bearing to provide substantially all radial support for the rotor when the radial active magnetic bearings are deenergized.

The sealed chamber is advantageously defined by an inner member, a substantially annular outer member, and a seal. At least part of the inner member is located within the outer member. One of the rotor shaft and the inner member may have a bore, while the other of the rotor shaft and the inner member may have an extension, which extends into the bore. Specifically, the inner member may have an extension that extends into a bore in the rotor shaft, or the rotor shaft may have an extension that extends into a bore in the inner member. The extension, the inner member, and/or the rotor shaft may be beveled in order to cause the rotor shaft to become centered if the axial active magnetic bearing is deenergized.

A gas circulator according to the invention may include a braking mechanism. The braking mechanism may comprise a flange connected to the rotor shaft, a flange connected to the inner member, and a device for selectively urging the flanges into contact. Additionally, if a liquid lubricant is held within the sealed chamber, a gas circulator according to the invention may include an assembly for preventing the liquid lubricant from traveling toward the rotor shaft. A device commonly referred to as a flinger may be employed for this purpose.

A gas circulator according to the invention may include a control circuit for the active magnetic bearings. The control circuit may permit the position of the rotor to be adjusted while the circulator is operating, i.e., while the rotor is rotating. In addition, the control circuit may have circuits for suppressing or reducing rotor vibrations.

BRIEF DESCRIPTION OF THE DRAWINGS

The above and other objects, features, and advantages of the invention will become apparent upon consideration of the following detailed description of illustrative embodiments thereof, especially when taken in conjunction with the accompanying drawings, wherein.

DETAILED DESCRIPTION OF THE PREFERRED EMBODIMENTS

Figure 1:
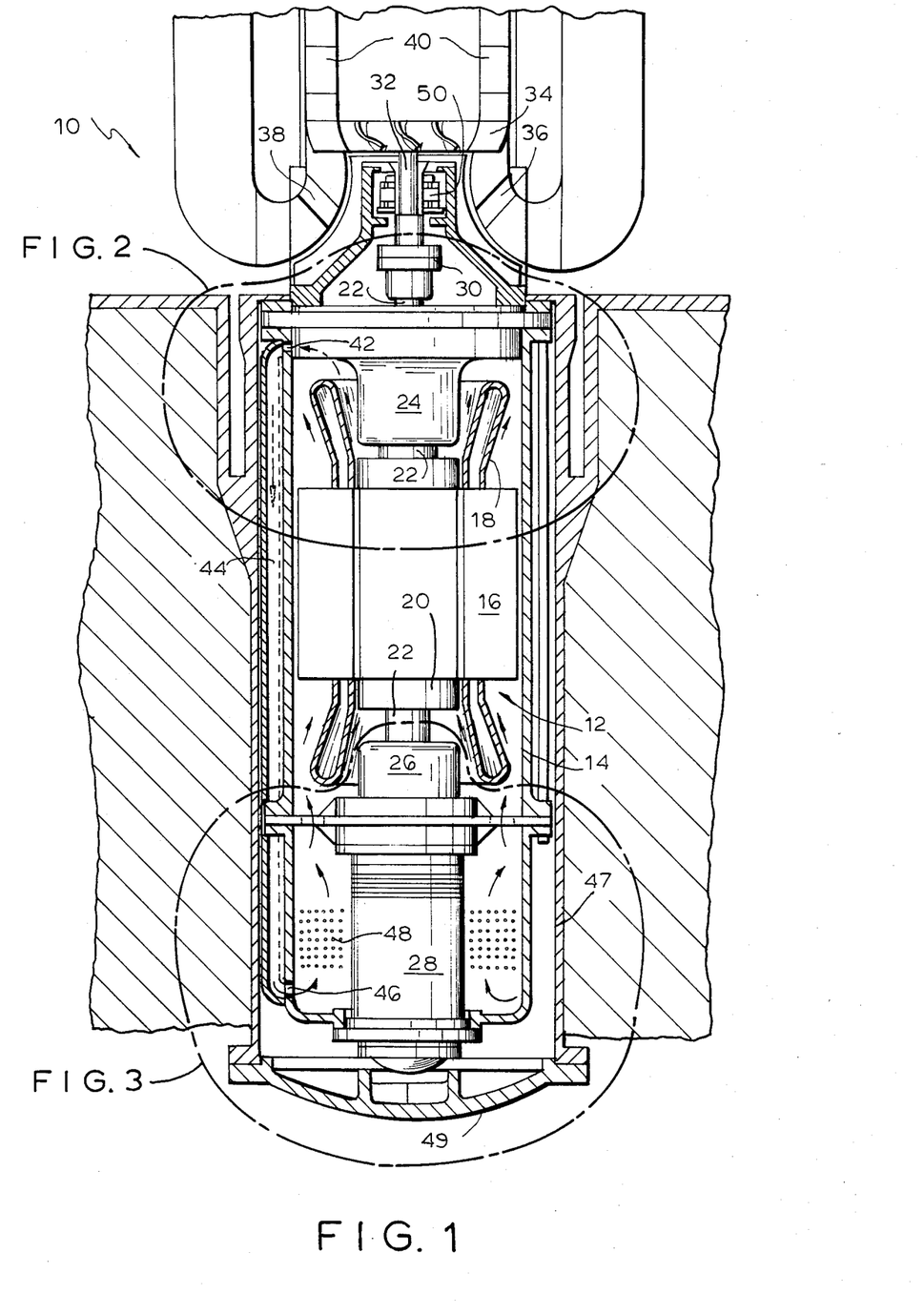
FIG. 1 is a side elevational view, partially in section, of a gas circulator according to the invention.
Figure 2:
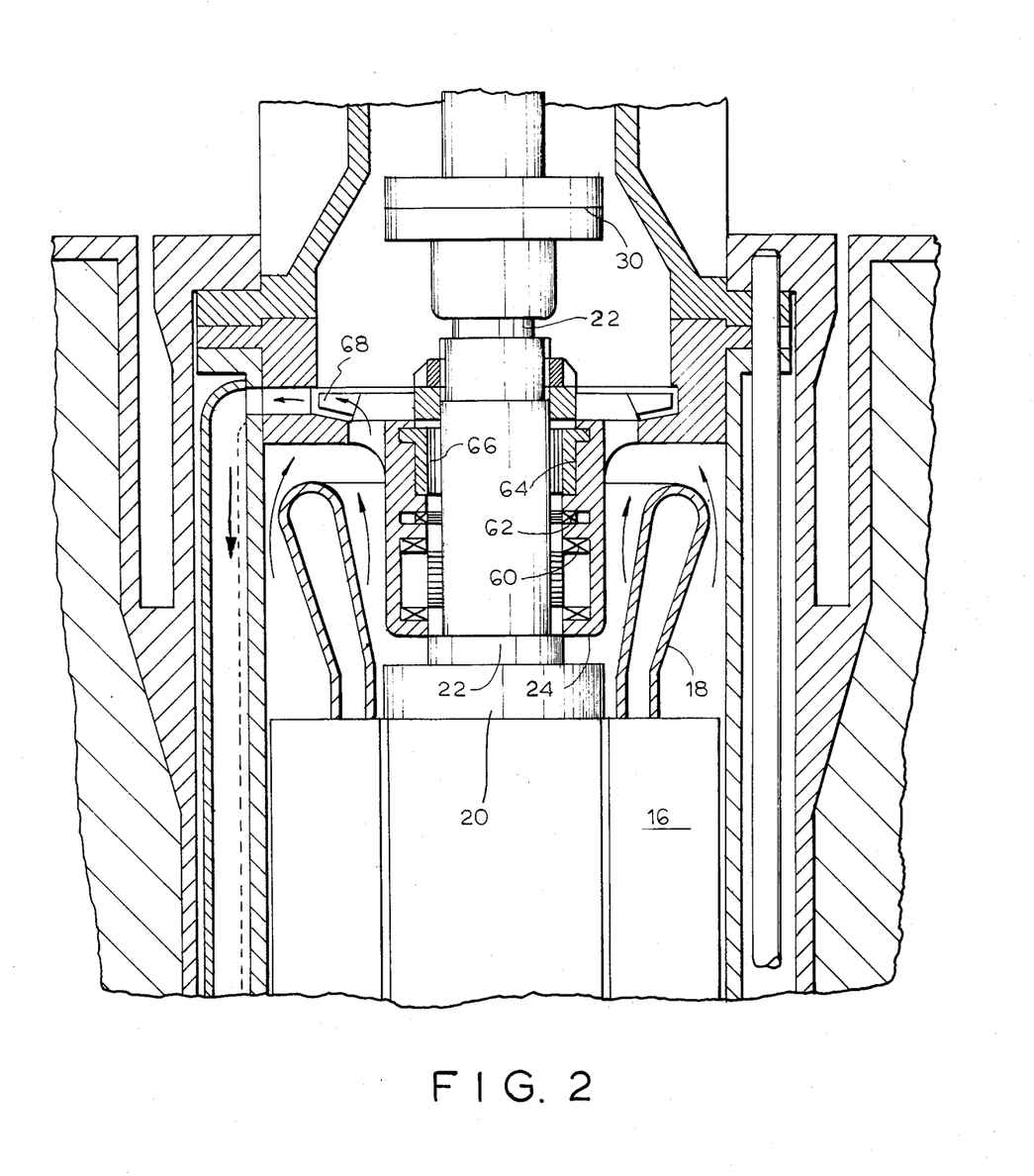
FIG. 2 is an enlarged cross-sectional view of the upper portion of the circulator shown in FIG. 1.
Figure 3:
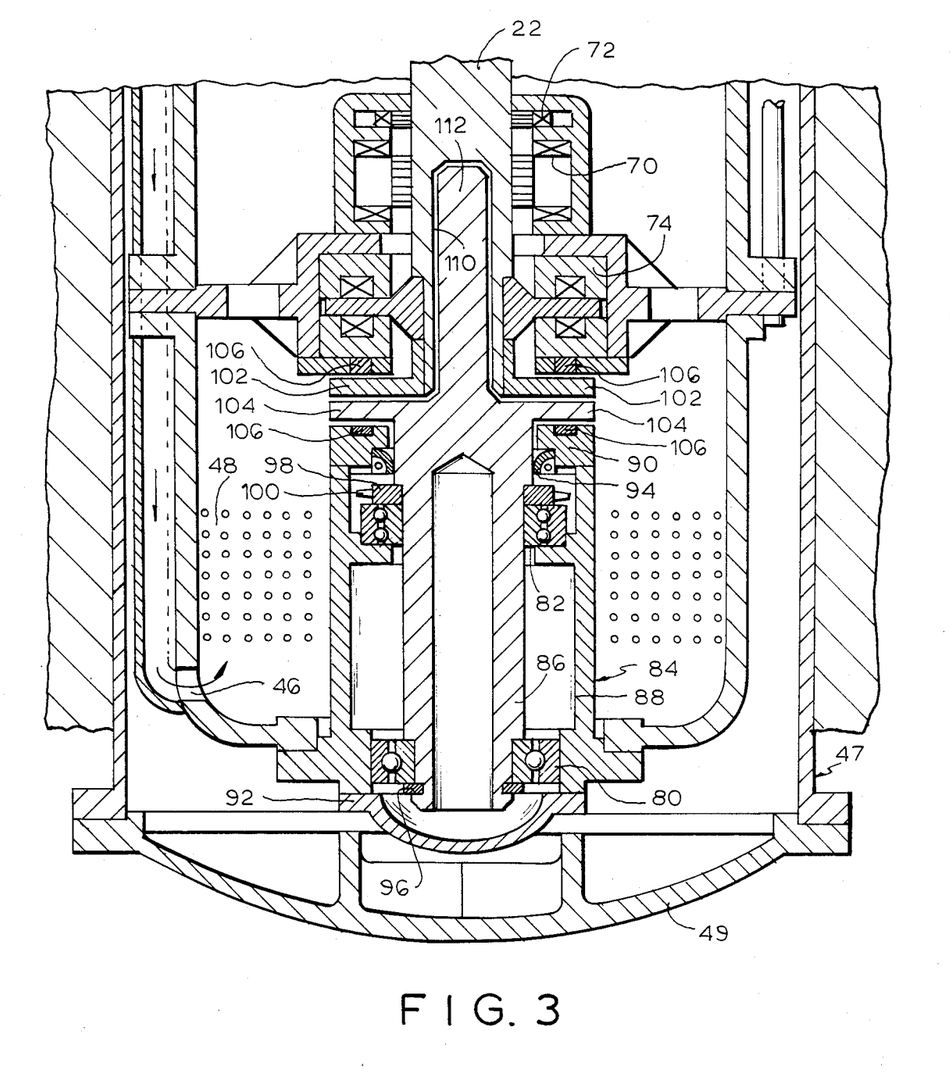
FIG. 3 is an enlarged cross-sectional view of the lower portion of the circulator shown in FIG. 1.

Referring now to the drawings, and specifically to FIG. 1, a gas circulator 10 according to the invention is shown. Gas circulator 10 is an electric drive circulator having a substantially vertical orientation and a main motor, generally designated by the reference numeral 12, which is housed within a pressure vessel 14. Main motor 12 includes a stator 16, with a number of windings 18, and a rotor 20, with a rotor shaft 22. The bearings for the upper end of rotor shaft 22 are located inside of a housing 24. FIG. 2 illustrates in greater detail the bearing arrangement for the upper end of the rotor shaft. The bearings for the lower end of the rotor shaft are located inside of a housing 26 and a housing 28. FIG. 3 shows in detail the bearing arrangement for the lower end of the rotor shaft.

The upper end of rotor shaft 22 is connected to a coupling 30, as seen in FIG. 1. The lower end of a shaft extension 32 is also connected to coupling 30, while the upper end thereof is attached to an impeller 34.

When the circulator is operating, gas coolant for the gas-cooled nuclear reactor, e.g., a helium-cooled nuclear reactor, flows through inlet guide vanes 36 and 38, past impeller 34, and into a straightener vane assembly 40. From straightener vane assembly 40, the gas coolant flows through pipes (not shown) into the nuclear reactor (not shown).

The arrows in FIG. 1 represent the flow of the cooling gas for the circulator. This gas coolant is the same as the gas coolant for the nuclear reactor and flows upwardly past windings 18 of stator 16 and out holes 42 in pressure vessel 14. Then, the gas flows downwardly through an elongated channel 44, which is formed on the outside surface of pressure vessel 14, and enters the interior of pressure vessel 14 through holes 46 in the pressure vessel. The gas then flows through a cooler 48 and back toward windings 18.

FIG. 1 illustrates gas circulator 10 contained within the primary system pressure boundary for the nuclear reactor system. The primary system pressure boundary is defined, in part, by pressure vessel 14. Since the circulator is located within the primary system pressure boundary, no system-to-ambient shaft seal is required. FIG. 1 shows a portion of the secondary pressure boundary, which surrounds and encloses the primary pressure boundary. Specifically, the secondary pressure boundary is defined, in part, by containment vessel 47 and bottom closure piece 49.

Shaft extension 32 is supported by a journal bearing 50, which is a radial active magnetic bearing. Active magnetic bearings and control systems for active magnetic bearings are described in the following patents: U.S. Pat. No. 3,702,208; U.S. Pat. No. 3,731,984; U.S. Pat. No. 3,787,100; U.S. Pat. No. 3,885,839; U.S. Pat.

No. 4,012,083; U.S. Pat. No. 4,023,920; U.S. Pat. No. 4,114,960; U.S. Pat. No. 4,121,143; U.S. Pat. No. 4,128,795; U.S. Pat. No. 4,141,604; U.S. Pat. No. 4,180,296; U.S. Pat. No. 4,180,946; U.S. Pat. No. 4,244,629; U.S. Pat. No. 4,302,061; U.S. Pat. No. 4,308,490; and U.S. Pat. No. 4,353,602. In addition, active magnetic bearings and control systems for active magnetic bearings are described below.

An active magnetic bearing is desirable as journal bearing 50 since the active magnetic bearing operates without lubricants, which may enter and contaminate the reactor system. In the following description, the abbreviation "AMB" will be used for the term "active magnetic bearing."

As indicated previously, FIG. 2 shows the bearing configuration for the upper end of rotor shaft 22. The upper end of rotor shaft 22 is supported by a radial AMB 60, and the position of the upper end of rotor shaft 22 is sensed by a radial position detector or sensor 62. A radial backup bearing 64 is provided in case radial AMB 60 fails or is deenergized. Radial backup bearing 64 has a graphite bushing 66, which is mounted in housing 24. If AMB 60 fails or is deenergized, rotor shaft 22 may tilt so that it touches graphite bushing 66. Under these circumstances, graphite bushing 66 provides radial support for rotor shaft 22. If the coefficient of friction of rotor shaft 22 against graphite is insufficiently low, a sleeve made from a metal having a low coefficient of friction against graphite may be mounted on rotor shaft 22. Such a sleeve may be pressed on or otherwise secured to rotor shaft 22. A graphite bushing is advantageously employed as the upper radial backup bearing because no bearing lubricant is required. Accordingly, lubricant leakage problems are nonexistent, and lubricant temperature limitations are not imposed on reactor system operating parameters.

Although FIG. 2 shows a graphite bushing as the upper radial backup bearing, other types of bearings may be used. The upper radial backup bearing may be an antifriction bearing, such as a ball bearing or a roller bearing.

As also seen in FIG. 2, an impeller 68 for the cooling gas for the circulator is attached to rotor shaft 22 at a location above the backup bearing 64. Cooling gas impeller 68 supplies the energy for urging the cooling gas to flow through the circulator.

As noted above, FIG. 3 shows the bearing configuration for the lower end of rotor shaft 22. The lower end of rotor shaft 22 is supported by a radial AMB 70, and the position of the lower end of rotor shaft 22 is sensed by a radial position detector or sensor 72. In addition, rotor shaft 22 is supported by an axial AMB 74, which functions as a thrust bearing. Backup bearings are provided for the radial AMB 70 and the axial AMB 74. Preferably, a double-row ball bearing 82 or a duplex ball bearing is used as the backup bearing for the axial AMB 74, while a ball bearing 80 is employed as the backup bearing for the radial AMB 70. The backup bearing for the axial AMB should provide radial as well as axial support for the rotor shaft.

For normal operations, the upper and lower radial AMBs provide radial support for the rotor, and the axial AMB provides axial support for the rotor. Thus, the rotor is supported by magnetic fields, not by mechanical means. Because AMBs are employed to support the rotor, the rotor may be dynamically balanced, as described in greater detail below. Due to the support given by the AMBs, noise and vibrations, especially those at a frequency that is a multiple of the circulator's basic rotative frequency, are minimized. Accordingly, a circulator with AMBs may be employed in applications requiring low noise levels.

Backup bearings 80 and 82 are located inside of a sealed chamber 84. Sealed chamber 84 is defined by an inner member 86, an outer member 88, an intermediate piece 90, a bottom closure piece 92, and a seal 94. Outer member 88 is substantially annular, and inner member 86 is positioned within outer member 88. Radial backup bearing 80 is held in place by inner member 86, outer member 88, and a snap ring 96, while axial backup bearing 82 is held in place by inner member 86, outer member 88, and a flinger 98. The purpose of flinger 98 is explained below.

A tight fit exists between inner member 86 and the inner races of backup bearings 80 and 82. Inner member 86 together with outer member 88 and seal 94 may be considered as a cartridge. The cartridge contains the backup bearings for the AMBs at the lower end of the rotor shaft. The entire cartridge is shown in FIG. 3, while portions of the cartridge are illustrated in greater detail in FIG. 4.

Figure 4:
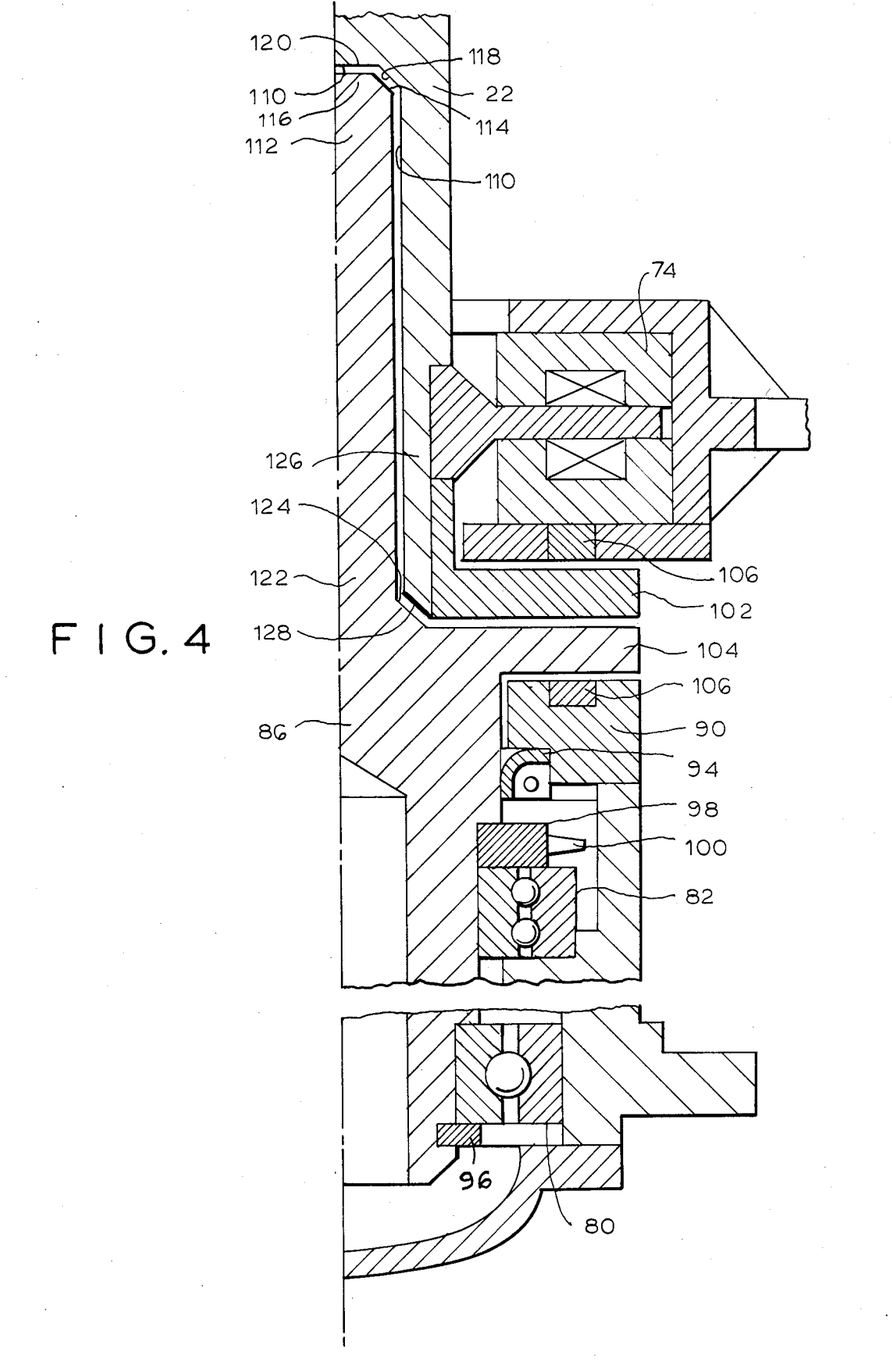
FIG. 4 is a cross-sectional view of a cartridge assembly for a circulator according to the invention.
Figure 5:
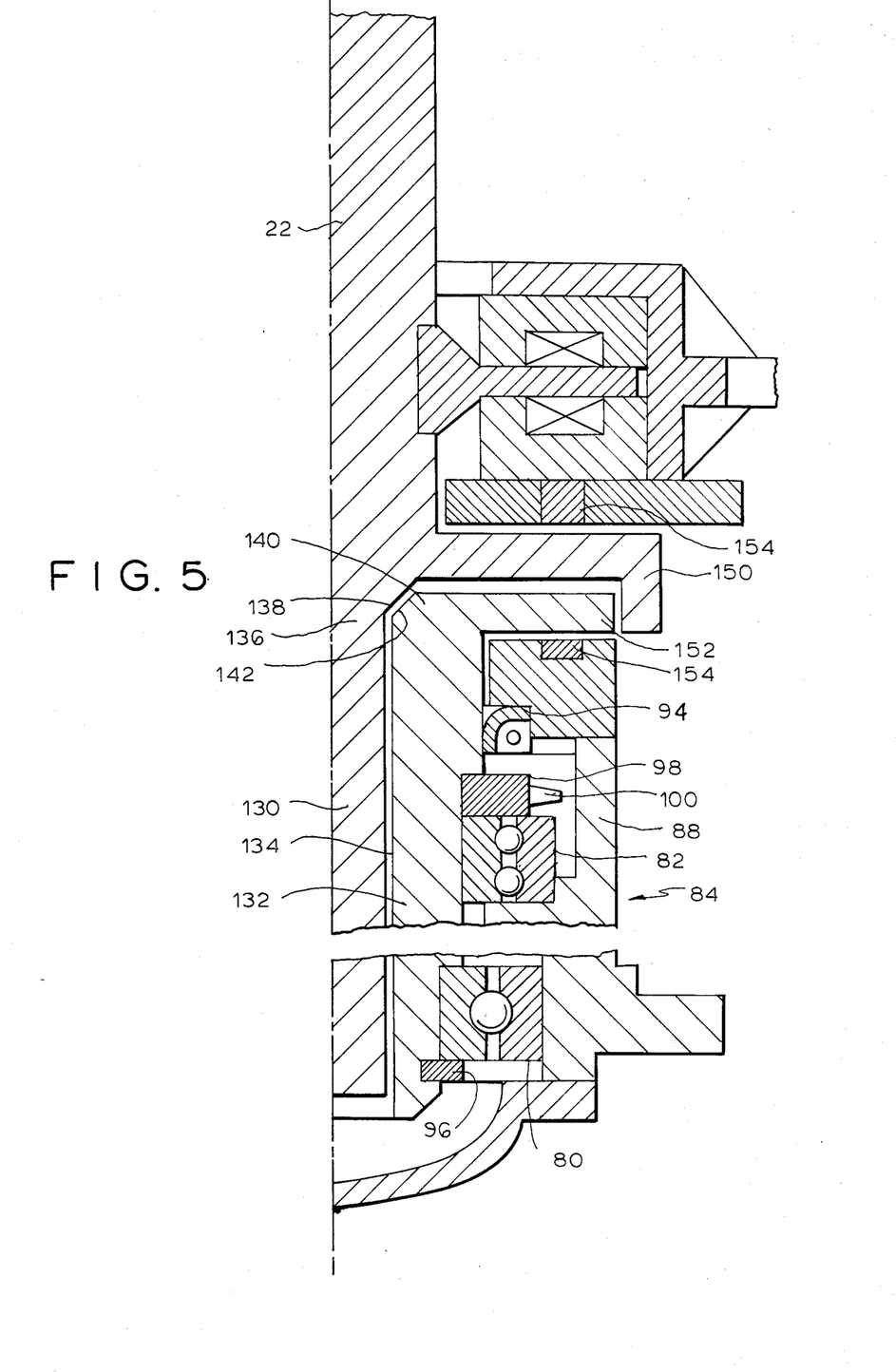
FIG. 5 is a cross-sectional view of another cartridge assembly for a circulator according to the invention.

FIG. 5 illustrates a modification of the cartridge shown in FIG. 4.

Inasmuch as backup bearings 80 and 82 will operate infrequently, these backup bearings may be utilized without any lubricant in chamber 84. Obviously, if the sealed chamber holds no lubricant, no lubricant may leak out of the chamber and contaminate the reactor system. However, since the chamber is sealed, a lubricant for the backup bearings may be contained within the chamber. Generally, lubricated bearings may be operated more times before failing than unlubricated bearings. Various types of lubricants may be used with the backup bearings. For instance, the bearings may be lubricated with a dry lubricant, such as the lubricant used for the moving parts in a control rod drive mechanism for a high-temperature, helium-cooled, graphite-moderated nuclear reactor. Other solid lubricants, e.g., a high-temperature grease or silicone, may be employed. Furthermore, a liquid lubricant may be enclosed within chamber 84. The liquid lubricant may be a conventional mineral oil or a high-temperature synthetic material, like silicone oil.

If a liquid lubricant is utilized, chamber 84 may be partially filled with the liquid lubricant so that when backup bearing 80 rotates, backup bearing 80 violently churns the liquid lubricant and causes the chamber to become filled with a mist of the liquid lubricant. In that case, the liquid lubricant may tend to travel toward seal 94 and into the reactor system. In order to eliminate a possible source of contamination of the reactor system, the liquid lubricant may be prevented from travelling toward and leaking past the seal. Flinger 98, which is secured to inner member 86, accomplishes this purpose. When inner member 86 rotates, backup bearing 80 stirs the liquid lubricant, thereby forming a mist, which may deposit lubricant on rotating surfaces and may cause lubricant to progress to the sealed area, but ring 100 of flinger 98 will, by centrifugal force, direct the lubricant against the surface of outer member 88 where it will drain back to the bottom of chamber 84.

As an additional precaution for preventing contamination of the reactor system by a lubricant in the chamber, seal 94 may be constructed to permit fluids to enter the chamber but prevent fluids from leaving the chamber. In other words, seal 94 advantageously operates like a check valve. If the pressure outside of the chamber is higher than the pressure inside of the chamber, the cooling gas for the circulator may enter the chamber. However, if the pressure inside of the chamber is higher than the pressure outside of the chamber, seal 94 closes the chamber and prohibits the contents of the chamber from entering the reactor system. The seal also prevents debris, such as wear debris, from entering the chamber, even if a lubricant is absent from the chamber.

By using radial and axial AMBs and by locating the radial backup bearing and the axial backup bearing within a sealed chamber, a potential source of reactor system contamination, specifically, the bearing lubricant, is eliminated. Either no lubricant is used, or the lubricant is enclosed within the sealed chamber. And if a lubricant is used, little or no maintenance for the lubricant is required. Moreover, complex bearing lubrication systems are unnecessary. The need for a bearing cooling system or a buffer gas system is avoided. Therefore, fewer penetrations of the primary system pressure boundary are required, which decreases the likelihood of a leak through the primary system pressure boundary. Additionally, rapid depressurization of the reactor system does not result in the lubricant entering the reactor system since the lubricant, if any, is held in the sealed chamber. Furthermore, the bearing arrangement illustrated in FIG. 3 places few constraints on reactor system operating parameters inasmuch as the lubricant, if any, is away from the gas coolant for the reactor. Hence, lubricant temperature limitations are not imposed on the reactor system.

FIG. 3 depicts a braking mechanism for the rotor shaft. The braking mechanism includes a flange 102 that is secured to rotor shaft 22 and a flange 104 that is connected to or an integral part of inner member 86. Flanges 102 and 104 have opposing faces. The braking mechanism further includes the calipers 106 and a system for actuating the calipers. The calipers may be actuated electrically in any convenient manner as would appear to those skilled in the art. When the axial AMB is nonoperative, shaft 22 falls and flange 102 contacts bottom shaft flange 104 via the mating bevel surfaces, thus bringing the lower assembly 86 up to the same speed as shaft 22. Then calipers 106 may be operated to slow and stop the total rotating assemblies quickly. Accordingly, flanges 102 and 104 constitute a disk brake assembly for the rotor shaft. Calipers 106 are advantageously actuated upon a complete loss of the electric power to the AMBs in order to quickly stop the rotor, thus minimizing the time the backup bearings are operated.

As shown in FIGS. 3 and 4, rotor shaft 22 has a bore 110, while inner member 86 has an extension 112, which extends into bore 110. When the axial AMB 74 is energized, the rotor lifts off of the inner member. Then, during normal circulator operations, clearances exist between extension 112 and bore 110 as well as between flange 102 and flange 104. Preferably, the elements are designed so that if the rotor shaft takes an angle, the spacing between axial backup bearing 82 and radial backup bearing 80 together with the clearance between bore 110 and extension 112 and/or the clearance between flange 102 and flange 104 are advantageously selected so that rotor shaft 22 and inner member 86 contact each other before the rotor shaft touches the upper backup bearing. The upper backup bearing may operate only in the event of a catastrophic failure. Consequently, the design of the upper radial backup bearing is not of major importance, and a wide variety of bearings may be utilized as the upper radial backup bearing. For instance, a graphite bushing, with or without an associated metal sleeve, may serve as the upper radial backup bearing. The advantages of this type of bearing are described above.

FIG. 4 illustrates in detail another feature of the invention. Extension 112 has a bevel 114 located at the upper end 116. Rotor shaft 22 has a corresponding bevel 118 located at the closed end 120 of bore 110. Bevel 114 matches bevel 118. Accordingly, when the axial AMB is deenergized, rotor shaft 22 moves down onto extension 112 of inner member, with bevels 114 and 118 making contact first. Bevels 114 and 118 center rotor shaft 22 on inner member 86 when the AMBs are deenergized.

The clearance between extension 112 and bore 110 and the length of extension 112 are advantageously selected to allow the radial and axial backup bearings in the sealed chamber to support the rotor if the AMBs are deenergized. The rotor shaft, upon a loss of electric power to the axial AMB or to the axial and radial AMBs, would drop until the bevels contacted each other. When the beveled surfaces touched each other, the inner member would almost instantaneously rotate at the same speed as shaft 22. The bevels would center the rotor shaft on the inner member, and the rotor shaft would be supported by the radial and axial backup bearings in the sealed chamber. The upper radial backup bearing would be needed only for a significant deflection of the rotor shaft, for instance, if a catastrophic failure occurred. The forces acting to nutate the spinning rotor are relatively small, and the radial and axial backup bearings in the sealed chamber resist such forces. The spinning rotor would be supported and centered on the inner member by the bevels. The rotor may coast to a stop, or it may be slowed down by the braking mechanism described above.

FIG. 4 shows another location at which similar bevels may be advantageously positioned. Here the bevels are located at the lower end of the extension and the open end of the bore. The bevels may be used in lieu of those at the upper end of the extension and the closed end of the bore. More particularly, the lower end 122 of extension 112 has a bevel 124, while the open end 126 of bore 110 has a corresponding bevel 128. Bevel 124 matches bevel 128, and they advantageously center rotor shaft 22 on inner member 86 when the AMBs are deenergized.

FIG. 5 depicts another configuration for the inner member, the rotor shaft, and the centering bevels. In this embodiment, rotor shaft 22 has an extension 130, and an inner member 132 has a bore 134, which receives extension 170. The upper end 136 of extension 130 has a bevel 138, while the upper end 140 of bore 134 has a corresponding bevel 142. These bevels 138 and 142 will center rotor shaft 22 in inner member 132.

As explained in greater detail below, an AMB for the gas circulator 10 includes a stator with electrical windings. In certain applications, the stators, including the windings, are desirably sealed off from the gas coolant for the nuclear reactor system. For instance, the stators may be sealed off if the gas coolant is especially corrosive.

Figure 6:
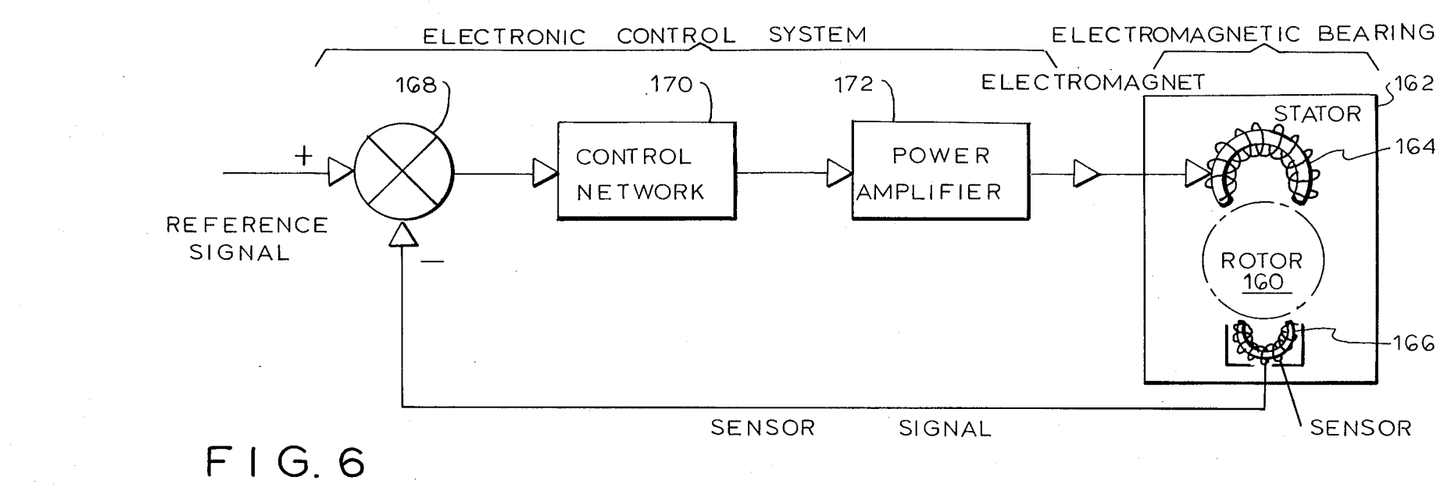
FIG. 6 is a schematic diagram of a control system for an active magnetic bearing.
Figure 7:
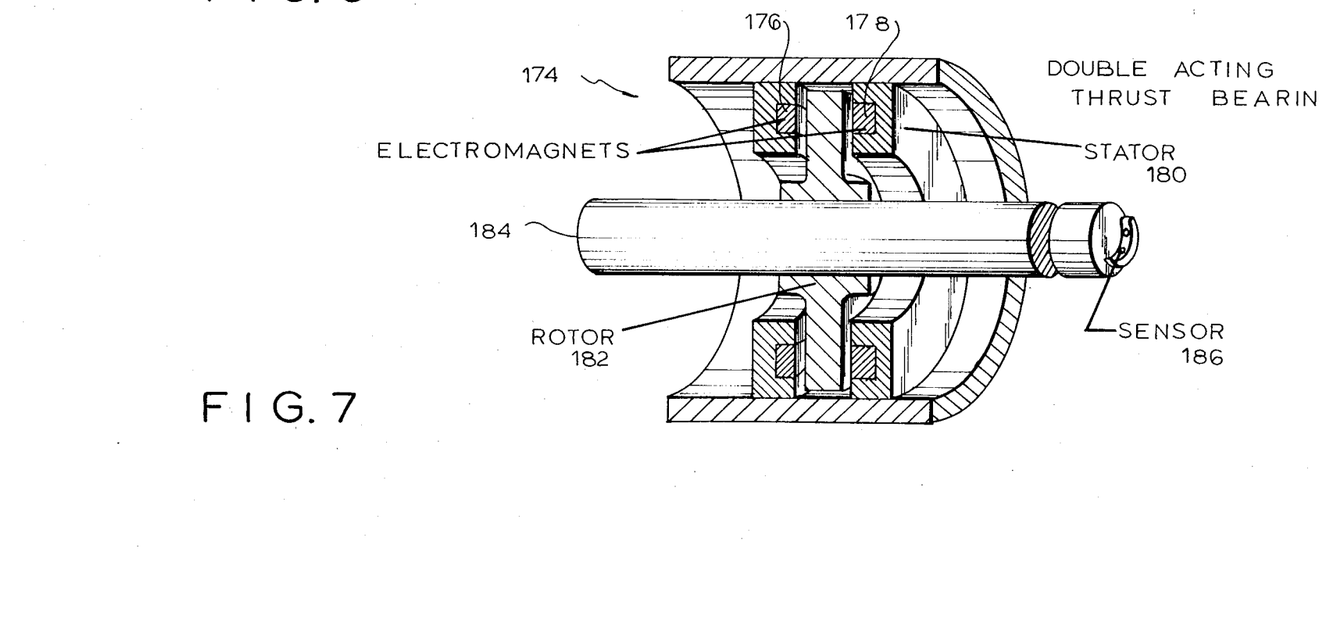
FIG. 7 is a diagrammatic illustration of an axial active magnetic bearing.
Figure 8:
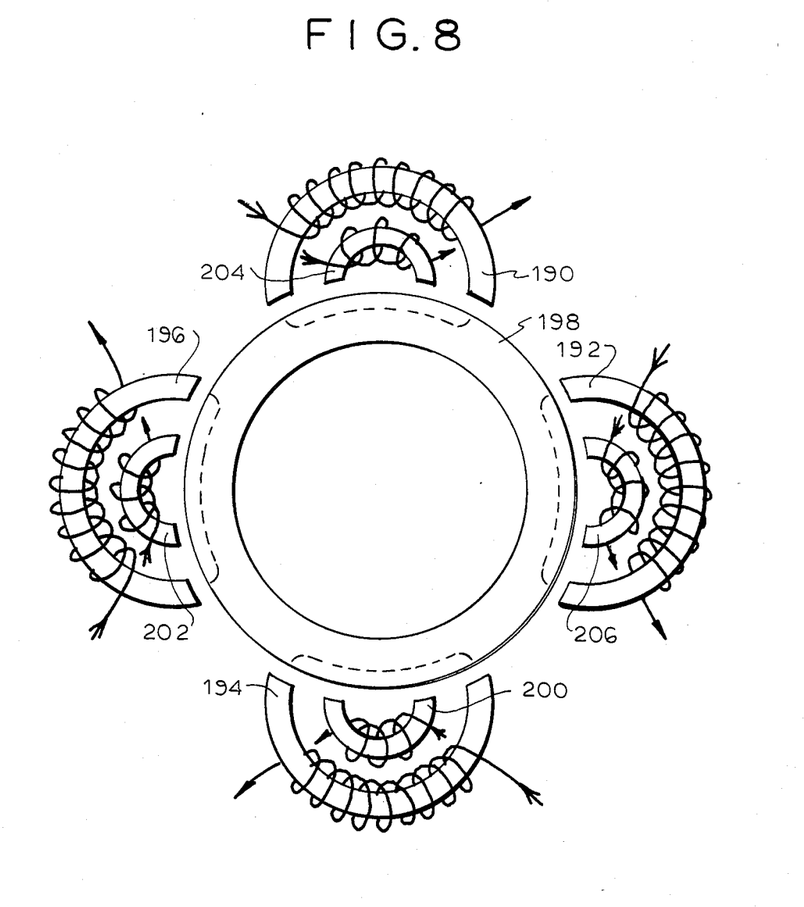
FIG. 8 is a diagrammatic illustration of a radial active magnetic bearing.

FIGS. 6, 7, and 8 show AMBs in greater detail. Generally, an AMB includes an electromagnetic bearing, an electronic control system, and a power supply. The electromagnetic bearing has a stator and a rotor.

The AMB that is schematically illustrated in FIG. 6 is a radial AMB having a rotor 160 (shown by the line with long and short dashes) and a stator 162 (shown in solid lines), an electromagnet 164, and an associated position sensor 166. Typically, four electromagnets and four position sensors are employed in a radial AMB, as illustrated in FIG. 8. However, for ease of illustration, only one electromagnet and one position sensor are shown in FIG. 6.

The stiffness and damping of the AMB are controlled through the electronic control system.

Position sensor 166 detects the position of rotor 160 and produces a sensor signal indicative of the rotor position which is supplied to a comparator 168. A reference signal, which is generated by control circuits (not shown), and which corresponds to the desired position of the rotor, is also supplied to comparator 168.

Comparator 168 determines the difference between the reference signal and the sensor signal and then forms an error signal based upon this difference. The error signal corresponds to the difference between the desired position of the rotor and the actual position of the rotor. The error signal is sent to a control network 170 which processes the error signal and provides a command signal to a power amplifier 172. The command signal indicates how much current the power amplifier should supply to electromagnet 164, which, in turn, exerts a restoring force on rotor 160.

The electronic control system for the AMB, therefore, employs a closed-loop servo system in order to control the position of the rotor, and the desired position of the rotor may be changed by adjusting the reference signal. Since four electromagnets and four position sensors are utilized for each radial AMB, four power amplifiers, one for each electromagnet, are used for each radial AMB.

Rotor 160 may be fabricated from ferromagnetic laminations without slots. The laminations are fitted to the rotor shaft and keep eddy current losses to a minimum. They usually have thicknesses of between about 0.05 millimeters and 0.35 millimeters and are generally made of 3% silicon-iron nonoriented material, which allows linear rotation speeds up to 200 meters per second.

Stator 162 typically has the same type of laminations as rotor 160. This configuration permits a maximum specific load capacity at the pole shoes of about 145 psi. On the stator, the laminations are stacked, and they include slots for the windings of the electromagnets.

Iron-cobalt laminations may be used in the stator and the rotor instead of silicon-iron laminations to improve the maximum load capacity at the pole shoes to about 260 psi. However, such laminations reduce the maximum allowable linear rotation speed to about 150 meters per second.

FIG. 8 schematically shows the electromagnetic bearing portion of the radial AMB. This part includes four electromagnets 190, 192, 194, and 196 together with four position sensors 200, 202, 204, and 206. Each of the four position sensors is located 180° from its associated electromagnet. Thus, electromagnets 190 and 194 cooperate to control the position of rotor 198 in the top-to-bottom direction in FIG. 8, while electromagnets 192 and 196 cooperate to control the position of rotor 198 in the side-to-side direction in FIG. 8. The current through the windings of each electromagnet, and therefore the force exerted by the electromagnet on the rotor, is controlled by the electronic control system for the electromagnet.

FIG. 7 diagrammatically illustrates an axial AMB 174, which functions as a thrust bearing. This AMB has two electromagnets 176 and 178 mounted in a stator 180 and a rotor 182 mounted on a shaft 184. Electromagnets 176 and 178 cooperate to control the longitudinal position of rotor 182 and shaft 184.

Although shaft 184 is shown in a substantially horizontal orientation in FIG. 7, the shaft for the axial AMB would have a substantially vertical orientation for a circulator arranged as shown in FIG. 1. Thus, shaft 184 may be integral part of rotor shaft 22.

Axial AMB 174 also includes a position sensor 186, and an electronic control system for each of electromagnets 176 and 178, which is similar to the electronic control system depicted in FIG. 6. Two power amplifiers, one for each electromagnet, are used for the axial AMB.

In axial AMB 174, every point on a face of rotor 182 remains in front of the same electromagnet. Consequently, eddy current losses are generally inconsequential, and rotor 182, therefore, may be made of a solid piece of magnetic material. The maximum load capacity of the axial AMB is about 145 psi. The air gap between the rotor and the stator in an axial AMB is similar to the air gap between the rotor and the stator in a radial AMB.

Preferably, a backup power supply for the AMBs is provided. The backup power supply is used to energize the AMBs in the event of a failure of the main power supply for the AMBs. The backup system is designed to suspend the rotor for a sufficiently long time to permit the operator to stop the machine or switch to an auxiliary power supply. The backup power supply advantageously includes a battery and equipment for switching the battery into the electrical system for the AMBs.

The electronic control system may be configured to cause the bearing stiffness to be zero at, and only at, the frequency corresponding to the rotor rotation. Accordingly, the axis of rotation of the rotor may be aligned with the inertial axis of the rotor while the rotor is rotating. In other words, the electronic control system may be employed to dynamically balance the rotor. This balancing is simply and automatically accomplished. Furthermore, this balancing of the rotor may reduce or eliminate noise and vibrations resulting from a rotor unbalance. If the circulator is affected by vibration caused by sources other than rotor unbalance, accelerometers may be suitably mounted on the stator. The accelerometers are utilized to measure the vibrations and send signals to the electronic control systems for the AMBs, which are appropriately modified to counter the vibrations. Hence, a circulator according to the invention may be operated with a minimum of noise and vibration. Consequently, a circulator according to the invention is particularly advantageous when used in an application requiring low noise levels.

Although particular illustrative embodiments of the present invention have been described herein with reference to the accompanying drawings, the present invention is not limited to these particular embodiments. For example, active magnetic bearings and sealed backup bearings may be employed in a gas circulator that has a substantially horizontal orientation. Furthermore, active magnetic bearings and one or more sealed backup bearings may be utilized for coolant pumps in other types of nuclear reactors, such as coolant pumps for pressurized water reactors or boiling water reactors. In such applications, the stators for the AMBs may be sealed off from contact with the reactor coolant. Accordingly, various changes and modifications may be made to the present invention by those skilled in the art without departing from the spirit or scope of the invention, which is defined by the appended claims.

We claim:

1. A gas circulator for a nuclear reactor, comprising:
   a stator;
   a rotor having a rotor shaft with a first end and a second end;
   an impeller attached to the first end of the rotor shaft;
   a first radial active magnetic bearing positioned proximate the first end of the rotor shaft;
   a first radial backup bearing positioned proximate the first end of the rotor shaft;
   a second radial active magnetic bearing positioned proximate the second end of the rotor shaft;
   a second radial backup bearing positioned proximate the second end of the rotor shaft;
   an axial active magnetic bearing positioned between the first and second ends of the rotor shaft; and
   an axial backup bearing positioned between the first and second ends of the rotor shaft;
   wherein two of the backup bearings are located within a sealed chamber.

2. A gas circulator as defined in claim 1, wherein the chamber contains a lubricant.

3. A gas circulator as defined in claim 2, wherein the lubricant is a solid lubricant.

4. A gas circulator as defined in claim 2, wherein the lubricant is a liquid lubricant.

5. A gas circulator as defined in claim 1, wherein the second radial backup bearing and the axial backup bearing are located within the chamber.

6. A gas circulator as defined in claim 5, wherein the second radial backup bearing is an antifriction bearing and wherein the axial backup bearing is an antifriction bearing.

7. A gas circulator as defined in claim 5, wherein the first radial backup bearing includes a graphite bushing mounted on the stator.

8. A gas circulator as defined in claim 7, wherein the first radial backup bearing further includes a metal sleeve mounted on the rotor shaft.

9. A gas circulator as defined in claim 5, wherein the axial backup bearing and second radial backup bearing are spaced apart sufficiently to permit the backup bearings to provide substantially all radial support for the rotor when the first and second radial active magnetic bearings are deenergized.

10. A gas circulator as defined in claim 5, wherein the sealed chamber is defined by an inner member, an outer member, and sealing means for forming a seal between the inner and outer members, the outer member being substantially annular and at least part of the inner member being located within the outer member.

11. A gas circulator as defined in claim 10, wherein one of the rotor shaft and the inner member has a bore and the other of the rotor shaft and the inner member has an extension with a first end and a second end, the extension extending into the bore, a clearance existing between the extension and the bore when the active magnetic bearings are energized.

12. A gas circulator as defined in claim 11, wherein the rotor shaft has the bore and the inner member has the extension, the first end of the extension extending into the bore, the second end of the extension being connected to the inner member.

13. A gas circulator as defined in claim 12, wherein the second end of the extension is beveled and the rotor shaft is correspondingly beveled.

14. A gas circulator as defined in claim 12, wherein the first end of the extension is beveled and the rotor shaft is correspondingly beveled.

15. A gas circulator as defined in claim 11, wherein the inner member has the bore and the rotor shaft has the extension, the first end of the extension extending into the bore, the second end of the extension being connected to the second end of the rotor shaft.

16. A gas circulator as defined in claim 15, wherein the second end of the extension is beveled and the inner member is correspondingly beveled.

17. A gas circulator as defined in claim 10, further comprising means for braking the rotor.

18. A gas circulator as defined in claim 17, wherein the means for braking the rotor includes a first flange connected to the rotor shaft, a second flange connected to the inner member, and means for loading the first flange and the second flange at their respective beveled contacting surfaces.

19. A gas circulator as defined in claim 10, wherein the chamber contains a liquid lubricant, and wherein means for preventing the liquid lubricant from traveling toward the rotor shaft are located within the chamber.

20. A gas circulator as defined in claim 19, wherein the preventing means includes a ring which by centrifugal force urges the liquid lubricant away from the rotor shaft.

21. A gas circulator as defined in claim 5, further comprising control means for adjusting the position of the rotor while the rotor is rotating.

22. A gas circulator as defined in claim 21, wherein the control means includes means for sensing rotor vibrations and means for reducing rotor vibrations.

23. A method for using a circulator for a gas-cooled nuclear reactor, comprising the steps of:
    supporting the circulator radially with a first active magnetic bearing and a second active magnetic bearing;
    supporting the circulator axially with a third active magnetic bearing;
    providing a first backup bearing for the first active magnetic bearing;
    providing a second backup bearing for the second active magnetic bearing;
    providing a third backup bearing for the third active magnetic bearing; and
    locating the second and third backup bearings in a sealed chamber.

24. A method as defined in claim 23, further comprising the step of electrically driving the circulator.

25. A method as defined in claim 23, wherein the supporting steps and the providing steps are performed within a primary system pressure boundary for the nuclear 26. A method as defined in claim 23, further comprising the step of introducing a lubricant into the 27. A method as defined in claim 26, wherein the introducing step includes introducing a solid lubricant into the chamber.

28. A method as defined in claim 26, wherein the introducing step includes introducing a liquid lubricant into the chamber.

29. A method as defined in claim 23, further comprising the step of supplying a braking mechanism for the circulator.

30. A method as defined in claim 23, further comprising the step of installing the circulator with a rotor shaft in a substantially horizontal orientation.

31. A method as defined in claim 23, further comprising the step of installing the circulator with a rotor shaft in a substantially vertical orientation.

32. A method as defined in claim 31, wherein the locating step includes locating both of the second and third backup bearings in a sealed chamber positioned proximate the bottom of the rotor shaft.

33. A method as defined in claim 32, wherein each providing step includes providing an antifriction backup bearing.

34. A nuclear reactor system, comprising:
a nuclear reactor contained within a primary system pressure boundary;
a gas coolant for the nuclear reactor; and
a gas circulator including a stator, a rotor having a rotor shaft with a first end and a second end, an impeller attached to the rotor shaft at the first end of the rotor shaft, a first radial active magnetic bearing positioned proximate the first end of the rotor shaft, a first radial backup bearing positioned proximate the first end of the rotor shaft, a second radial active magnetic bearing positioned proximate the second end of the rotor shaft, a second radial backup bearing positioned proximate the second end of the rotor shaft, an axial active magnetic bearing positioned between the first and second ends of the rotor shaft, an axial backup bearing positioned between the first and second ends of the rotor shaft;
wherein the gas circulator is contained within the primary system pressure boundary.

35. A nuclear reactor system as defined in claim 34, wherein the rotor shaft has a substantially vertical orientation.

36. A nuclear reactor system as defined in claim 35, wherein the second radial backup bearing and the axial backup bearing are located within a sealed chamber.

37. A nuclear reactor system as defined in claim 36, wherein the first radial backup bearing includes a graphite bushing mounted on the stator, wherein the second radial backup bearing is an antifriction bearing, and wherein the axial backup bearing is an antifriction bearing.

38. A nuclear reactor system as defined in claim 37, wherein the first radial backup bearing further includes a metal sleeve mounted on the rotor shaft.

39. A nuclear reactor system as defined in claim 34, further comprising control means for controlling the active magnetic bearings to adjust the position of the rotor.

40. A nuclear reactor system as defined in claim 39, wherein the control means includes means for suppressing rotor vibrations.

41. A nuclear reactor system as defined in claim 34, wherein the active magnetic bearings include windings and wherein the windings are sealed off from the gas coolant.

42. A method for operating a nuclear reactor, comprising the steps of:
pumping a coolant through the nuclear reactor with a pump;
supporting the pump radially with two active magnetic bearings;
supporting the pump axially with an active magnetic bearing;
providing backup bearings for the radial active magnetic bearings;
providing a backup bearing for the axial active magnetic bearing; and
enclosing one radial backup bearing and the axial backup bearing in a sealed chamber.

43. A method as defined in claim 42, wherein the pumping step includes pumping a gas coolant through the nuclear reactor.

44. A method as defined in claim 42, wherein the pumping step includes pumping the coolant with an electrically driven pump.

45. A method as defined in claim 42, wherein the pumping step includes pumping the coolant with a pump having a substantially vertical shaft.

46. A method as defined in claim 42, wherein the pumping step includes pumping the coolant with a pump having a substantially horizontal shaft.

47. A method as defined in claim 42, further comprising the step of introducing a lubricant into the chamber.

48. A method as defined in claim 47, wherein the introducing step includes introducing a solid lubricant into the chamber.

49. A method as defined in claim 47, wherein the introducing step includes introducing a liquid lubricant into the chamber.

50. A method as defined in claim 42, wherein the providing and enclosing steps are performed within a primary system pressure boundary for the nuclear reactor.

51. A method as defined in claim 42, wherein each active magnetic bearing includes a stator, further comprising the step of sealing off the stators of the active magnetic bearings from the coolant.

* * * * *